(No Model.) 2 Sheets—Sheet 1.
S. EVERSHED.
MAGNETO ELECTRIC GENERATOR.
No. 484,785. Patented Oct. 25, 1892.
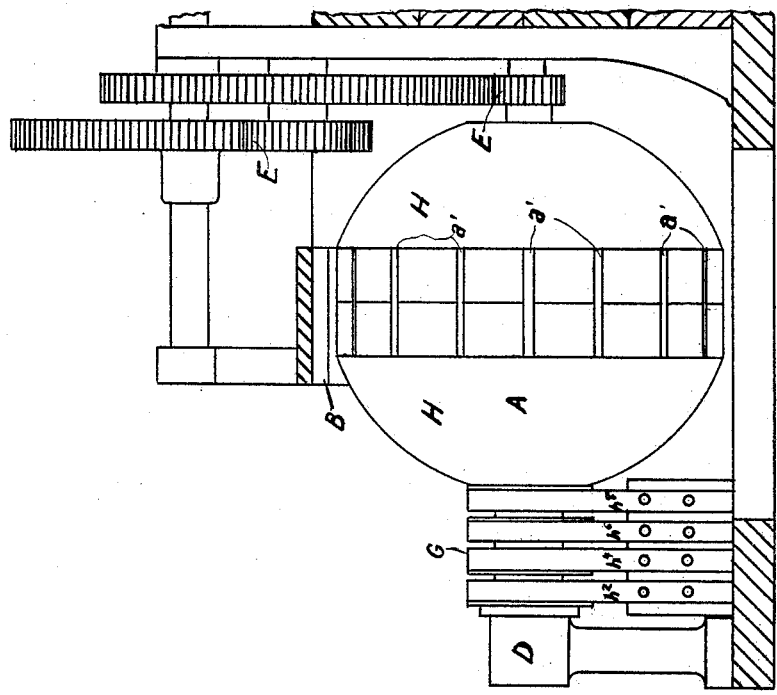
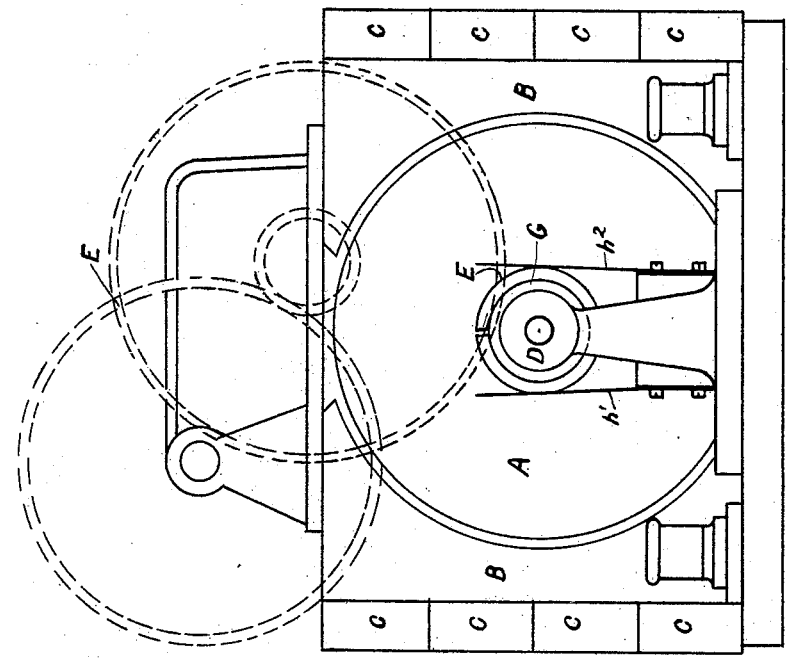
Witnesses:
C. B. Bolton
H. S. Palmer
Inventor:
Sydney Evershed
By
Richards
his Attorneys.

(No Model.) 2 Sheets—Sheet 2.

S. EVERSHED.
MAGNETO ELECTRIC GENERATOR.

No. 484,785. Patented Oct. 25, 1892.

UNITED STATES PATENT OFFICE.

SYDNEY EVERSHED, OF LONDON, ENGLAND.

MAGNETO-ELECTRIC GENERATOR.

SPECIFICATION forming part of Letters Patent No. 484,785, dated October 25, 1892.

Application filed January 8, 1892. Serial No. 417,434. (No model.)

*To all whom it may concern:*

Be it known that I, SYDNEY EVERSHED, residing at London, England, have invented an Improvement in Electric Generators, of which the following is a specification.

My invention relates to improvements in dynamo-electric generators whereby they are made applicable for use with electric measuring-instruments—such as ohmmeters—in order to measure the insulation resistance of electric mains, dynamos, &c. It is found in practice that it is desirable to measure the insulation resistance of any conductor or machine while it is under the full working difference of potential. An ordinary common shuttle-armature, with a two-part commutator wound to give a current of sufficient voltage, will effect this purpose, provided the circuit or mains to be tested have no appreciable electrostatic capacity. When, however, the circuit or mains to be tested have an appreciable electrostatic capacity, the undulatory electro-motive force due to a shuttle-armature machine causes errors in the indications of the ohmmeter, for in addition to the true leakage current flowing through the insulation there is an alternate current in and out of the circuit in consequence of its capacity, leading to a spurious deflection of the ohmmeter-index, so that the instrument indicates a resistance lower than the true value.

My invention consists in the construction and arrangement of a dynamo-electric generator which when used with an ohmmeter will give a constant electro-motive force, thus overcoming the defect before mentioned, and will at the same time be a very portable instrument, which can be carried about and operated with great facility when a test is to be made.

In order that my invention may be the better understood, I will now describe it in relation to the drawings hereunto annexed, reference being had to the letters marked thereon.

Figure 3:
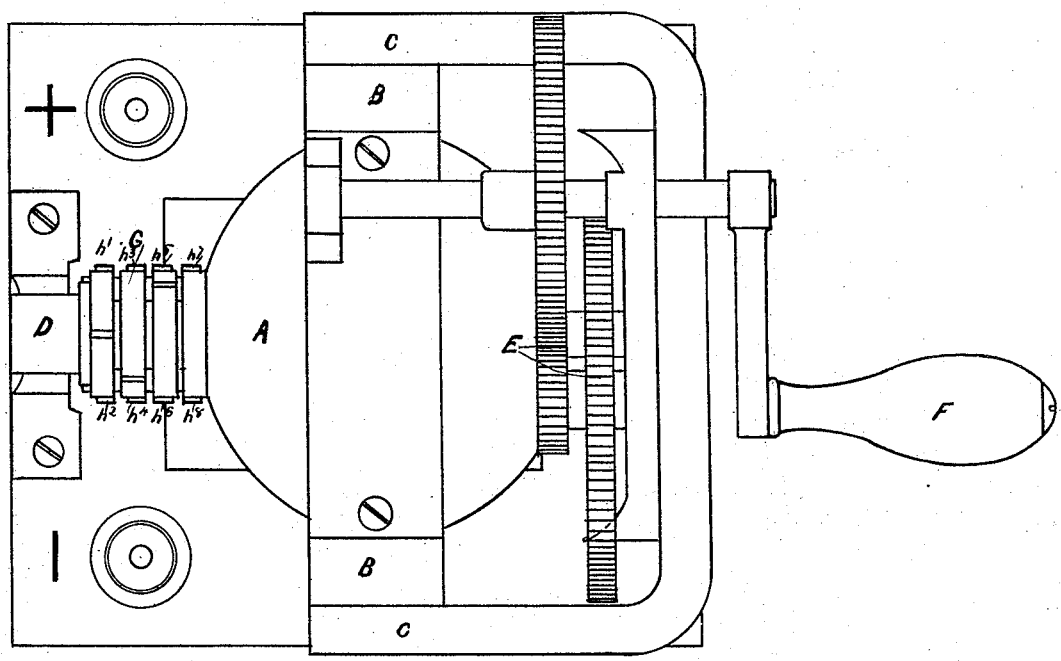
Figure 4:
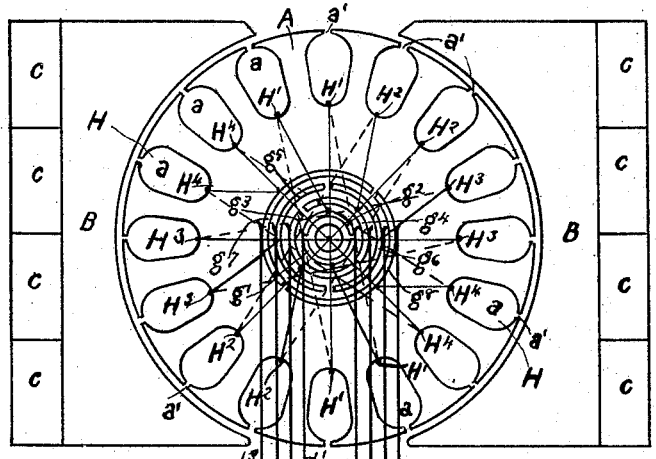

Figure 1 is an end elevation of a generator constructed according to my invention. Fig. 2 is a side sectional elevation of the same. Fig. 3 is a plan of the same. Fig. 4 is a sectional view of the field-magnets and the armature, showing, diagrammatically, the method of winding and connection of the armature-coils to the commutator.

The armature A may be made of cast-iron or built up of soft-iron disks in the usual manner and is made to fit the pole-pieces B, with a very small clearance or air gap, so that a moderate magnetizing force on the field-magnets suffices. I show the pole-pieces B B energized by permanent magnets C C C C.

The armature A is mounted in bearings D, so as to revolve therein and to be driven by gearing E, operated by hand through the handle F.

The commutator G is divided into eight parts and is composed of eight separate pieces $g'$, $g^2$, $g^3$, $g^4$, $g^5$, $g^6$, $g^7$, and $g^8$, consisting of four rings in halves. These pieces are arranged around the commutator-boss, so that each ring breaks joint one-eighth of a revolution in advance and in the rear of its neighbors—that is to say, that the end of strip $g'$, for example, is one-eighth of a revolution from its adjacent strip $g^3$, and so on. Against these commutator-pieces brushes $h'$, $h^2$, $h^3$, $h^4$, $h^5$, $h^6$, $h^7$, and $h^8$ press, four brushes being disposed on one side of the commutator and four on the other.

The armature A has a series of holes $a$ arranged through it parallel to the axis near the periphery, having narrow passages $a'$ leading from the periphery to them, through which the wire passes into the holes $a$ during the process of winding the armature-coils.

An ordinary drum-winding may be used on the armature A; but as it is preferable to use as few turns of wire as possible, I usually wind four or eight coils on the armature, each coil being coupled to an independent two-part commutator, as before described, the brushes of the commutator being connected so that the armature-coils H are all in series. By this method only half the number of turns required in a drum-armature are used, while the four or eight two-part commutators are as simple as one four-part or eight-part commutator. When eight coils are used, the variation in electro-motive force during a revolution is practically nil, while with four coils the variation amounts to about four per cent. of the average electro-motive force and produces negligible errors when the capacity of the circuits being tested does not exceed one-fourth microfarad.

In Fig. 4 I show a four-coil armature with the connections diagrammatically shown.

The coil H' starts from the commutator-strip $g'$, then passes through the holes in the armature $a$, and is finally attached to the piece $g^2$ of the commutator. The + terminal is connected to the brush $h'$, which is rubbing on the commutator-piece $g'$, and the brush $h^2$, which is rubbing the commutator-piece $g^2$, is connected to the brush $h^3$, which rubs commutator-strip $g^3$, and so on, the wire from coil $H^4$ being connected to commutator-strip $g^8$, which rubs on brush $h^8$, which is connected to the terminal. It will thus be seen that the whole of the four coils are connected up together by the brushes and commutators in series.

Having now described my invention, what I claim is—

1. A portable dynamo or magneto electric generator consisting of an armature having a core closely fitting pole-pieces energized by permanent magnets, the said armature-core having holes therethrough parallel to the axis and narrow slots extending from periphery to the said holes to effect the winding of the coils, the said coils being connected up independently to as many two-part commutators as there are coils and brushes rubbing on the said commutator to connect the said armature-coils in series and with the terminals of the generator, substantially as described.

2. In an electric generator, the combination of an armature-core having holes therethrough and narrow slots extending from the periphery to the said holes to effect the winding of the coils in the holes, the said core closely fitting between pole-pieces energized by permanent magnets with as many two-part commutators as there are independent coils on the armature, and brushes rubbing on the commutators and connected so that the total electro-motive force at the terminals of the generator is equal to the sum of the electro-motive forces of all the coils, substantially as described, and for the purposes set forth.

In testimony whereof I have signed my name to this specification in the presence of two subscribing witnesses.

SYDNEY EVERSHED.

Witnesses:
REGINALD W. JAMES,
RICHARD A. HOFFMANN.